US008029350B2

(12) United States Patent
Pacey

(10) Patent No.: US 8,029,350 B2
(45) Date of Patent: Oct. 4, 2011

(54) GAMING SYSTEM MODELLING 3D VOLUMETRIC MASSES

(75) Inventor: Larry Pacey, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 771 days.

(21) Appl. No.: 12/066,029

(22) PCT Filed: Aug. 22, 2006

(86) PCT No.: PCT/US2006/032995

§ 371 (c)(1),
(2), (4) Date: Mar. 6, 2008

(87) PCT Pub. No.: WO2007/032874

PCT Pub. Date: Mar. 22, 2007

(65) Prior Publication Data

US 2008/0220863 A1 Sep. 11, 2008

Related U.S. Application Data

(60) Provisional application No. 60/715,640, filed on Sep. 9, 2005.

(51) Int. Cl.
*A63F 9/24* (2006.01)
*A63F 13/00* (2006.01)

(52) U.S. Cl. ............................... 463/16; 463/20; 463/22

(58) Field of Classification Search ............. 463/16–20, 463/22
See application file for complete search history.

(56) References Cited

U.S. PATENT DOCUMENTS 6,261,177 B1 * 7/2001 Bennett .......................... 463/16
6,811,482 B2 11/2004 Letovsky
6,866,585 B2 3/2005 Muir
6,886,585 B1 5/2005 King, Jr. et al.
6,887,157 B2 5/2005 LeMay et al.
2002/0094856 A1 * 7/2002 Bennett et al. .................. 463/16
2003/0032479 A1 2/2003 LeMay et al.
2003/0054871 A1 * 3/2003 Baerlocher .................... 463/16
2003/0064781 A1 4/2003 Muir
2004/0002380 A1 1/2004 Brosnan et al.
2004/0053686 A1 3/2004 Pacey et al.
2004/0102244 A1 5/2004 Kryuchkov et al.

(Continued)

FOREIGN PATENT DOCUMENTS

WO WO-2004002591 A2 1/2004
WO WO-2004028650 A1 4/2004
WO WO-2004029893 A1 4/2004
WO WO-2006039257 A1 4/2006
WO WO-2006039348 A1 4/2006
WO WO-2006039371 A2 4/2006
WO WO-2007146264 A2 12/2007

OTHER PUBLICATIONS

"International Search Report for Application No. PCT/US2006/32995, date mailed Apr. 4, 2007", 4 pgs. "Written Opinion of the International Searching Authority for Application No. PCT/US2006/32995, date mailed Apr. 4, 2007", 6 pgs.

*Primary Examiner* — Peter DungBa Vo
*Assistant Examiner* — Jasson Yoo
(74) *Attorney, Agent, or Firm* — Schwegman, Lundberg & Woessner, P.A.

(57) ABSTRACT

Embodiments of the invention described herein include, in a pick-based gaming machine, a method of displaying a gaming outcome. The method includes displaying an image having a plurality of picks arranged adjacent to a plurality of objects; receiving a pick selection; simulating, as a function of the pick selection, a drop of fluid falling through the plurality of objects to fall in or past receptacles; and determining a gaming outcome as a function of fluid accumulated in the receptacles.

18 Claims, 4 Drawing Sheets

U.S. PATENT DOCUMENTS

| | | | |
|---|---|---|---|
| 2004/0102245 | A1 | 5/2004 | Escalera et al. |
| 2004/0192430 | A1 | 9/2004 | Burak et al. |
| 2004/0266536 | A1 | 12/2004 | Mattice et al. |
| 2005/0037843 | A1 | 2/2005 | Wells et al. |
| 2005/0059487 | A1 | 3/2005 | Wilder et al. |
| 2005/0075167 | A1 | 4/2005 | Beaulieu et al. |
| 2005/0215319 | A1 | 9/2005 | Rigopulos et al. |
| 2005/0233799 | A1 | 10/2005 | LeMay et al. |
| 2005/0255908 | A1 | 11/2005 | Wells |
| 2006/0052152 | A1 | 3/2006 | Tedsen et al. |

* cited by examiner

GAMING SYSTEM MODELLING 3D VOLUMETRIC MASSES

RELATED APPLICATIONS

This application is a U.S. National Stage Filing under 35 U.S.C. 371 from International Patent Application Serial No. PCT/US2006/026259, filed Jul. 5, 2006, and published on Jan. 11, 2007 as WO 2007/005992 A1, which claims the priority benefit of U.S. Provisional Application Ser. No. 60/715,640, filed Sep. 9, 2005, the contents of which are incorporated herein by reference in their entirety.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

BACKGROUND OF THE INVENTION

1. Field of the Invention

This patent application pertains generally to gaming systems, and more particularly, but not by way of limitation, to a system and method for displaying three-dimensional gaming effects in a gaming machine.

2. Background Information

Video gaming machines are popular within the gaming industry. They typically are operable to play traditional games such as slots, poker, bingo, keno and blackjack. Such machines have been enhanced in recent years by adding effects that make them more attractive, exciting and entertaining.

Pick games are a popular type of game. In a pick game, the player chooses from a number of selections. The selection then triggers particular gaming outcomes. Pick games are either used alone, or in combination with reel-based games to provide bonus events. Bonus events occur outside the reel spin, injecting either a random event or fostering some player interaction to trigger a random event.

The graphical capabilities of processors have increased dramatically over the last decade. At the same time, there is a continuing need to develop new and exciting effects for video gaming machines. What is needed is a way of harnessing the graphics power of processors to introduce new and innovative pick games in video gaming machines.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
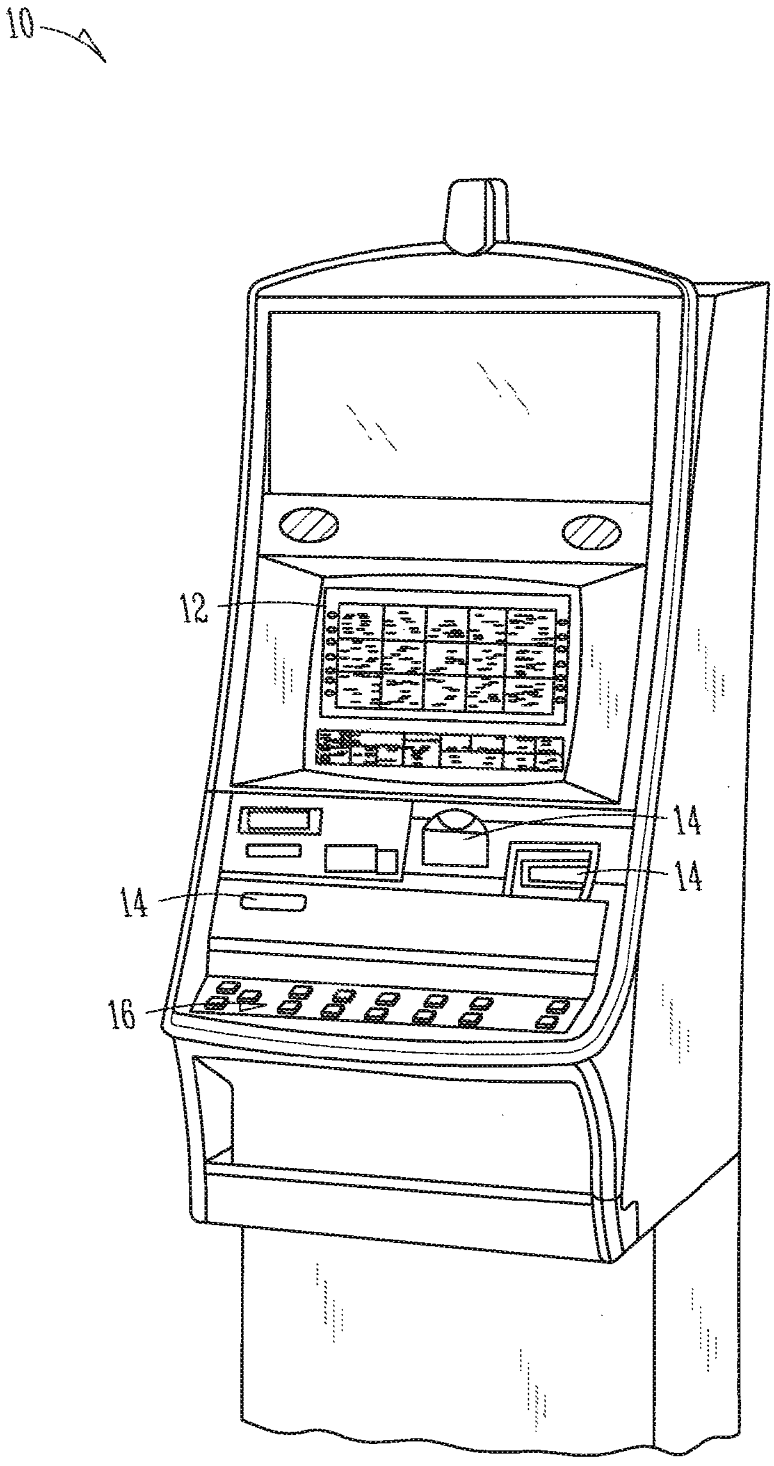
FIG. 1 illustrates a gaming machine according to the present invention.

FIG. 1 illustrates an exemplary video gaming machine 10, also referred to as a Video Lottery Terminal (VLT), in which embodiments of the invention may be implemented. In some embodiments, gaming machine 10 is operable to conduct a wagering game such as mechanical or video slots, poker, keno, bingo, or blackjack. The gaming machine 10 shown in FIG. 1 includes a video display 12 such as a cathode ray tube (CRT), liquid crystal display (LCD), plasma, or other type of video display known in the art. In one such embodiment, a touch screen overlies the display 12. In the illustrated embodiment, the gaming machine 10 is an "upright" version in which the display 12 is oriented vertically relative to a player. Alternatively, the gaming machine may be a "slant-top" version in which the display 12 is slanted at about a thirty-degree angle toward the player. Other orientations could be used as well.

Gaming machine 10 includes one or more credit receiving mechanisms 14 for receiving credits to be used for placing wagers in the game. The credit receiving mechanisms 14 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money. In some embodiments, credit receiving mechanism 14 receives credits through a network interface.

In some embodiments, the gaming machine 10 includes a user interface comprising a plurality of push-buttons 16, the above-noted touch screen, and other possible devices. The plurality of push-buttons 16 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. The touch screen may define touch keys for implementing many of the same functions as the push-buttons. Other possible user interface devices include a keyboard and a pointing device such as a mouse or trackball.

A processor controls operation of the gaming machine 10. In response to receiving a wager and a command to initiate play, the processor randomly selects a game outcome from a plurality of possible outcomes and causes the display 12 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the processor awards the player with a number of credits associated with the winning outcome.

Figure 2:
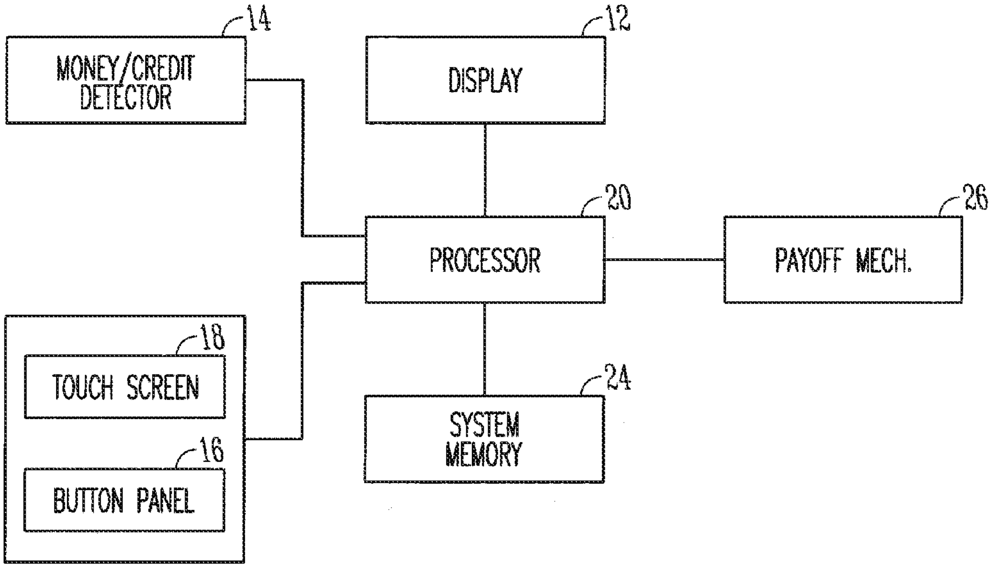
FIG. 2 is a block diagram of a control system suitable for operating the gaming machine of FIG. 1.

FIG. 2 is a block diagram of a control system suitable for operating the gaming machine 10. Money/credit detector 22 signals a processor 20 when a player has inserted money, tickets, tokens, cards or other mechanism for obtaining credits for plays on the gaming machine through credit mechanisms 14. Using a button panel 16 and/or a touch screen 18, the player may select any variables associated with the wagering game and place his/her wager to purchase a play of the game. In a play of the game, the processor 20 generates at least one random event using a random number generator (RNG) and provides an award to the player for a winning outcome of the random event.

Alternatively, the random event may be generated by a remote computer using an RNG or pooling schema and then transmitted to the gaming machine. The processor 20 operates the display 12 to represent the random event(s) and outcome(s) in a visual form that can be understood by the player. In addition to the processor 20, the control system may include one or more additional slave control units for operating the display 12 and any secondary displays.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure.

A payoff mechanism 26 is operable in response to instructions from the processor 20 to award a payoff to the player. The payoff may, for example, be in the form of a number of credits. The number of credits is determined by one or more math tables stored in, for example, system memory 24.

In one embodiment, gaming machine 10 includes a reel-based game with three-dimensional game effects.

In one embodiment, three-dimensional games are implemented using a game design package such as RenderWare Studio 2.0 running, for example, on a processor designed by Intel or AMD.

Figure 3:
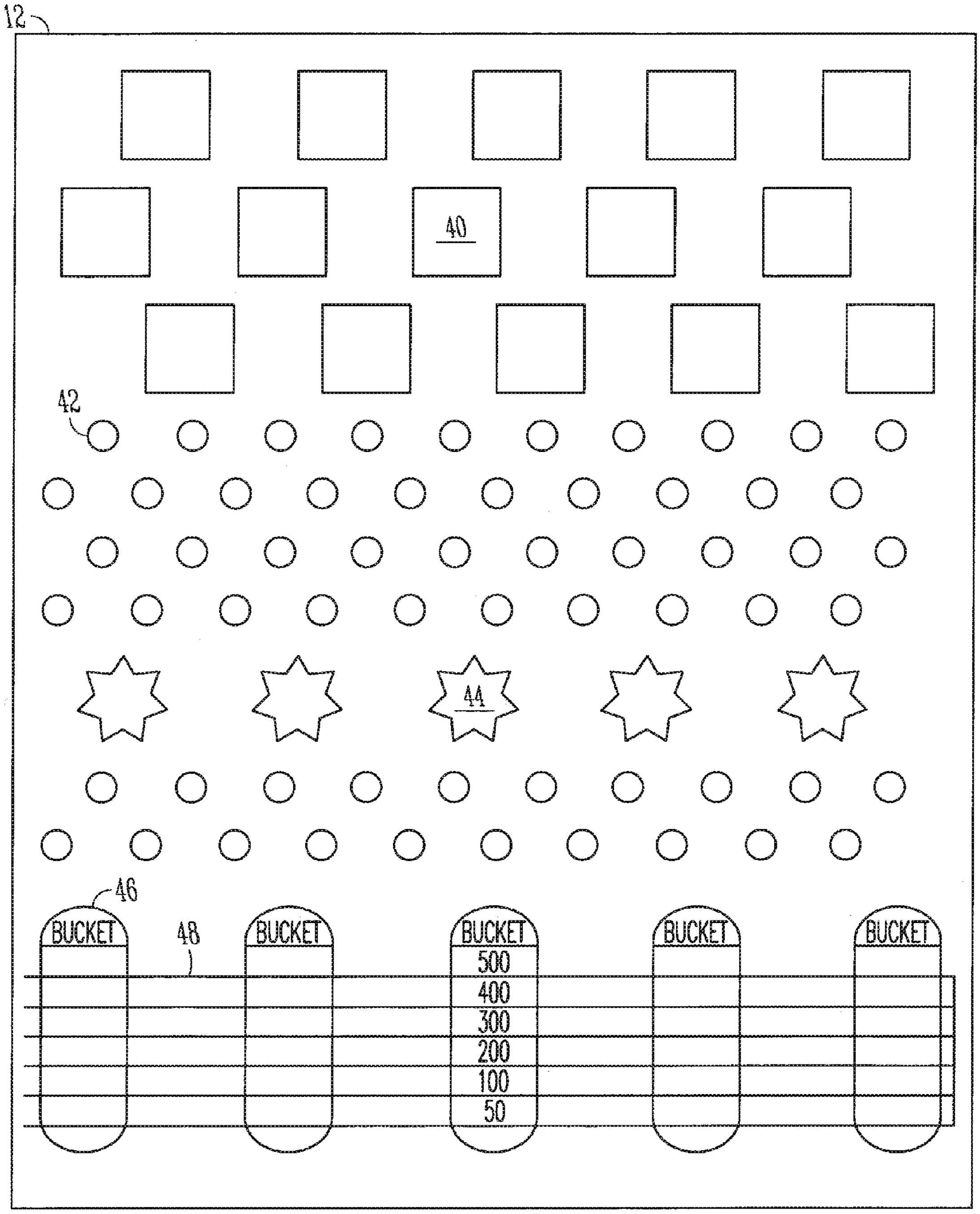
FIGS. 3 and 4 illustrate a pick game according to one example embodiment of the present invention.

An interesting pick game can be made based on the simulation of physical objects. In the example shown in FIG. 3, an array of pick fields 40 is shown located above rows of pegs 42 and spinners 44 on a display 12. A player selects a pick field 40, releasing a drop of fluid from the vicinity of the pick field 40. System 10 simulates the effects of gravity as the drop falls into the field of pegs 42 and spinners 44, breaking into smaller drops as they encounter the pegs 42 and spinners 44. The drops either fall into buckets 46 or appear to fall off display 12.

In one such embodiment, each drop adds some volume to the fluid accumulating in the bucket 46 into which it falls. The player can track how full each bucket is by comparing the level of the bucket 46 to gradation levels 48. At the end of game play, system 10 evaluates each bucket and pays out based on the level of fluid in each bucket 46.

Figure 4:
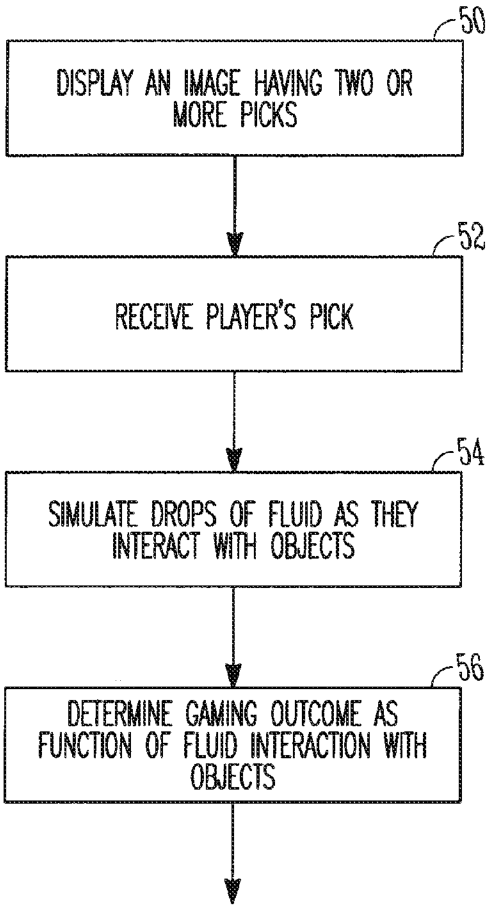

In one embodiment, as is shown in FIG. 4, processor 20 displays an image at 50 having two or more picks. Processor 20 receives the player's pick at 52 and simulates at 54 a drop of fluid falling through objects such as pegs 42 and spinners 44 to fall in or past buckets 46. Processor 20 then determines a gaming outcome at 56 as a function of the simulation.

In one embodiment, the fluid simulated is a dense liquid such as mercury.

In one embodiment, players select from variables effecting game play. For instance, one player may select to play in a system with low gravity, or to play in a system with many, smaller drops of fluid, or with different or multiple fluid densities.

In one embodiment, players can activate two of more pick fields 40, generating two or more drops that cascade through pegs 42 and spinners 44 fall on or past buckets 46.

In one embodiment, drops come in more than one color. In one such embodiment, drops layer into buckets 46 such that the colors do not mix. In another embodiment, the colored drops mix, with the shade of color in each bucket 46 acting to multiply the bucket's value. In yet another embodiment, a particular "special" color globule (e.g., red or gold) falling into a bucket 46 turns the bucket that color, multiplying the bucket's value.

In one embodiment, a drop changes color when it contacts particular objects. For instance, a gold peg would change the color of a drop to gold. If that drop fell into a bucket, it would multiply the bucket's value.

In the above discussion, the term "processor" is defined to include any digital or analog data processing unit. Examples include any microprocessor or microcontroller capable of embodying the inventions described herein.

Examples of articles comprising machine readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The invention claimed is:

1. A method of displaying a gaming outcome in a pick-based game, comprising:

displaying, via one or more display devices, an image having a plurality of picks arranged adjacent to a plurality of objects;

receiving, via one or more input devices, a pick selection;

simulating, via one or more processors and as a function of the pick selection, a drop of liquid falling from an initial position into the plurality of objects, the drop interacting with one or more objects from the plurality of objects while falling, the interacting altering a characteristic of the drop, the altered characteristic comprising at least one of a color and a quantity, and the drop falling to a final position in or past one or more receptacles;

providing an award, wherein a value of the award is determined by the final position and a final characteristic of the drop.

2. The method of claim 1, wherein the altered characteristic further comprises a falling direction.

3. The method of claim 1, wherein the altered quantity characteristic comprises a dispersal of the drop into multiple small drops.

4. The method of claim 3, wherein providing an award includes paying as a function of a volume of drops in the one or more receptacles.

5. The method of claim of claim 3, wherein providing an award includes paying as a function of drop color and volume of drops in the one or more receptacles.

6. The method of claim 1, wherein receiving a pick selection includes receiving user selections of user selectable game variations.

7. The method of claim 1, further comprising, prior to receiving a pick selection, receiving an initial characteristic of a drop selection from a player, wherein the initial characteristic can be altered by the interacting with one of the objects.

8. The method of claim 7, wherein the initial characteristic is selected from the group including, but not limited to, a drop color, a drop density, a drop size, and a drop mass, a drop falling speed, and a drop falling direction.

9. A pick-based gaming system, comprising:

at least one display;

a user interface; and one or more processors operating with the at least one display and the user interface to:

display an image having a plurality of picks arranged adjacent to a plurality of objects;

receive a pick selection from the user interface;

simulate, as a function of the pick selection, a drop of liquid falling from an initial position into the plurality of objects, the drop interacting with one or more objects from the plurality of objects while falling, the interacting altering a characteristic of the drop, the altered characteristic comprising at least one of a color and a quantity, and the drop falling to a final position in or past one or more receptacles;

provide an award, wherein a value of the award is determined by the final position and a final characteristic of the drop.

10. The system of claim 9, wherein the one or more processors execute program code for simulating the drop interacting with the objects.

11. The system of claim 9, wherein the processor executes program code for simulating dispersal of the drop into multiple small drops based on interacting with the objects.

12. The system of claim 11, wherein the processor pays out as a function of a volume of drops in the receptacle.

13. The system of claim 9, wherein the processor displays user selectable game variations and modifies its simulation as a function of the display's user selectable game variations.

14. A method of displaying a gaming outcome in a pick-based game, the method comprising:

displaying, via one or more display devices, an image having a plurality of picks arranged adjacent to a plurality of objects;

receiving, via one or more input devices, a first pick selection;

simulating, via one or more processors and as a function of the first pick selection, a first drop of liquid falling from a first initial position into the plurality of objects, the first drop interacting with one or more objects from the plurality of objects while falling, the interacting altering a first drop characteristic, the altered first drop characteristic comprising at least one of a color and a quantity, and the first drop falling into or past one or more receptacles to reach at least one first final position;

receiving, via one or more input devices, a second pick selection;

simulating, via one or more processors and as a function of the second pick selection, a second drop of liquid falling from a second initial position into the plurality of objects, the second drop interacting with one or more objects from the plurality of objects while falling, the interacting altering a second drop characteristic, the altered second drop characteristic comprising at least one of a color and a quantity, and the second drop falling into or past one or more receptacles to reach at least one second final position; and providing an award, wherein a value of the award is determined by the final positions and final drop characteristics of the first and second drops, respectively.

15. The method of claim 14, wherein the altered first drop characteristic comprises a dispersal of the first drop into a first plurality of small drops.

16. The method of claim 15, wherein at least one of the small drops of the first plurality has a different first final position from another one of the small drops.

17. The method of claim 16, wherein providing an award includes evaluating the drops in one of the one or more receptacles and evaluating the drops in another one of the one or more receptacles, wherein the one receptacle has a different value than the another receptacle.

18. The method of claim 14, wherein the altered first drop characteristic comprises a drop color, and wherein the drop color multiplies a receptacle value.

* * * * *

UNITED STATES PATENT AND TRADEMARK OFFICE

CERTIFICATE OF CORRECTION

PATENT NO. : 8,029,350 B2
APPLICATION NO. : 12/066029
DATED : October 4, 2011
INVENTOR(S) : Larry Pacey It is certified that error appears in the above-identified patent and that said Letters Patent is hereby corrected as shown below:

On the Title page, in Item (56) under "Other Publications", in column 2, lines 2-4, after "4 pgs." delete ""Written Opinion of the International Searching Authority for Application No. PCT/US2006/32995, date mailed Apr. 4, 2007", 6 pgs." and insert the same on line 3 as a new entry.

In column 1, lines 6-12, delete "This application is a U.S. National Stage Filing under 35 U.S.C. 371 from International Patent Application Serial No. PCT/US2006/026259, filed Jul. 5, 2006, and published on Jan. 11, 2007 as WO 2007/005992 A1, which claims the priority benefit of U.S. Provisional Application Ser. No. 60/715,640, filed Sep. 9, 2005, the contents of which are incorporated herein by reference in their entirety." and
insert -- This application is a U.S. National Stage Filing under 35 U.S.C. 371 from International Patent Application Serial No. PCT/US2006/032995, filed Aug. 22, 2006, and published on Mar. 22, 2007 as WO 2007/032874 A1, which claims the priority benefit of U.S. Provisional Application Ser. No. 60/715,640, filed Sep. 9, 2005, the contents of which are incorporated herein by reference in their entirety. --, therefor.

In column 4, line 46, in Claim 5, after "of claim" delete "of claim".

Signed and Sealed this
Twenty-sixth Day of June, 2012

David J. Kappos
*Director of the United States Patent and Trademark Office*